United States Patent [19]

Martin

[11] Patent Number: 4,884,770

[45] Date of Patent: Dec. 5, 1989

[54] EARTH-TO-ORBIT VEHICLE PROVIDING A REUSABLE ORBITAL STAGE

[75] Inventor: James A. Martin, Gloucester, Va.

[73] Assignee: The United States of America as represented by the National Aeronautics and Space Administration, Washington, D.C.

[21] Appl. No.: 76,955

[22] Filed: Jul. 23, 1987

[51] Int. Cl.$^4$ .............................................. B64G 1/14
[52] U.S. Cl. ................ 244/158 R; 244/160; 244/161; 244/172
[58] Field of Search ................ 244/158 R, 160, 161, 244/172

[56] References Cited

U.S. PATENT DOCUMENTS

| | | |
|---|---|---|
| 3,421,714 | 1/1969 | Koerner . |
| 3,753,536 | 8/1973 | White ................ 244/161 |
| 3,891,160 | 6/1975 | Minovitch . |
| 3,929,306 | 12/1975 | Faget et al. . |
| 3,955,784 | 5/1976 | Salkeld ................ 244/172 |
| 4,079,904 | 3/1978 | Groskopfs et al. ............... 244/161 |
| 4,082,240 | 4/1978 | Heathman et al. . |
| 4,265,416 | 5/1981 | Jackson et al. ............... 244/160 |
| 4,273,305 | 6/1981 | Hinds ............... 244/158 R |
| 4,451,017 | 5/1984 | Marshall ............... 244/172 |
| 4,471,926 | 9/1987 | Steel . |
| 4,723,736 | 2/1988 | Rider ............... 244/158 R |

OTHER PUBLICATIONS

"Teleoperator System for Management of Satellite Deployment and Retrieval"; Tewell et al; NTC Conference Record of the IEEE 1978.

"Inertial Upper Stage . . . A Match for Every Space Mission"; Boeing.

*Primary Examiner*—Galen L. Barefoot
*Attorney, Agent, or Firm*—Harold W. Adams; John R. Manning; George F. Helfrich

[57] ABSTRACT

A reusable earth-to-orbit vehicle 28 with an orbital stage 10 sized to fit into a payload bay equipped, earth-return-capable space vehicle 26 such as the United States Space Shuttle. The orbital stage 10 is equipped with a reusable rocket engine 13 capable of operation from the earth's surface to earth orbit. The orbital state 10 propels itself into earth orbit with the help of boosters 11 that separate and return to earth before orbit is reached. After delivering its payload 12, the orbital stage 10 is placed in the earth-return-capable space vehicle's payload bay 29 and returned to earth for reuse.

4 Claims, 4 Drawing Sheets

EARTH-TO-ORBIT VEHICLE PROVIDING A REUSABLE ORBITAL STAGE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to the field of space launch systems. More particularly the invention pertains to an apparatus and a method for delivering payloads from earth to orbit utilizing reusable components.

2. Description of the Prior Art

As the commercial, scientific, and military use of outer space continues to increase, the need for inexpensive transportation to earth orbit also increases. Present earth-to-orbit transportation systems include Expendable Launch Vehicles (ELV's) and the United States Space Shuttle.

Expendable Launch Vehicles are rocket systems that are discarded after a single launch. They tend to be expensive because an entirely new vehicle must be built and tested for each mission.

The Space Shuttle is a rocket system that utilizes reusable components. It consists of two solid rocket boosters, an expendable fuel tank, and a winged orbiter. The orbiter is capable of delivering cargo to earth orbit, and reentering earth's atmosphere for a glider type landing on a runway. It has the capability of returning cargo from space, but often lands with an empty payload bay. The use of reusable hardware was intended to decrease the transportation cost per pound of cargo compared with expendable launch vehicles.

Reusable earth-to-orbit launch vehicles, such as the Space Shuttle, must have means to reenter the earth's atmosphere and land on earth upon the completion of its orbital mission. To do this, the Space Shuttle requires systems for thermal protection and atmospheric flight. These systems are costly in terms of weight, overall vehicle performance, and vehicle maintenance requirements.

Other reusable space transport vehicles without a capability of reentry from orbit are generally known. One such vehicle, disclosed in U.S. Pat. No. 3,891,160 by Minovitch, is a microwave powered reusable orbiting space tug. Its purpose is to maneuver an object already placed in orbit by utilizing microwave beams directed from earth as a power source. Another idea for a space tug, called the Orbital Transfer Vehicle (OTV) by NASA, uses the Space Shuttle to deliver it to earth orbit and return it to earth. By using the Space Shuttle for its return to earth, the OTV itself does not need costly systems for reentry. Both of these vehicles operate only in space, and therefore cannot transport a payload from the earth's surface.

OBJECTS OF THE INVENTION

It is an object of this invention to provide transportation to earth orbit using a reusable earth-to-orbit vehicle that does not itself need costly systems for entry from orbit, thereby keeping operating and development costs to a minimum.

It is a further object of this invention to increase the number of Space Shuttle missions that utilize its ability to return objects from space.

Other objects and advantages of this invention will become apparent hereinafter in the specification and drawings which follow.

SUMMARY OF THE INVENTION

According to the present invention, the foregoing and additional objects are obtained by providing a reusable earth-to-orbit vehicle including an orbital stage sized to fit into a payload bay of an earth-return-capable space vehicle. The orbital stage is equipped with a reusable rocket engine capable of providing thrust from the earth's surface to earth orbit. One or more boosters detachably secured to the orbital stage for additional thrust are capable of separating from the orbital stage before the orbital stage reaches orbit.

A method of delivering a payload from the earth's surface to earth orbit is provided wherein a reusable earth-to-orbit vehicle is operated in conjunction with an earth-return-capable space vehicle equipped with a payload bay, such as the United States Space Shuttle. In practice, the Space Shuttle may first be launched into earth orbit. The reusable earth-to-orbit vehicle, including an orbital stage sized to fit into the payload bay, is then launched into an orbit within the operating range of the Space Shuttle. The Space Shuttle may then rendezvous with the orbital stage. Thereafter the orbital stage is inserted into the payload bay of the Space Shuttle, which returns the orbital stage to earth for reuse.

DESCRIPTION OF THE PREFERRED EMBODIMENT

Figure 1:
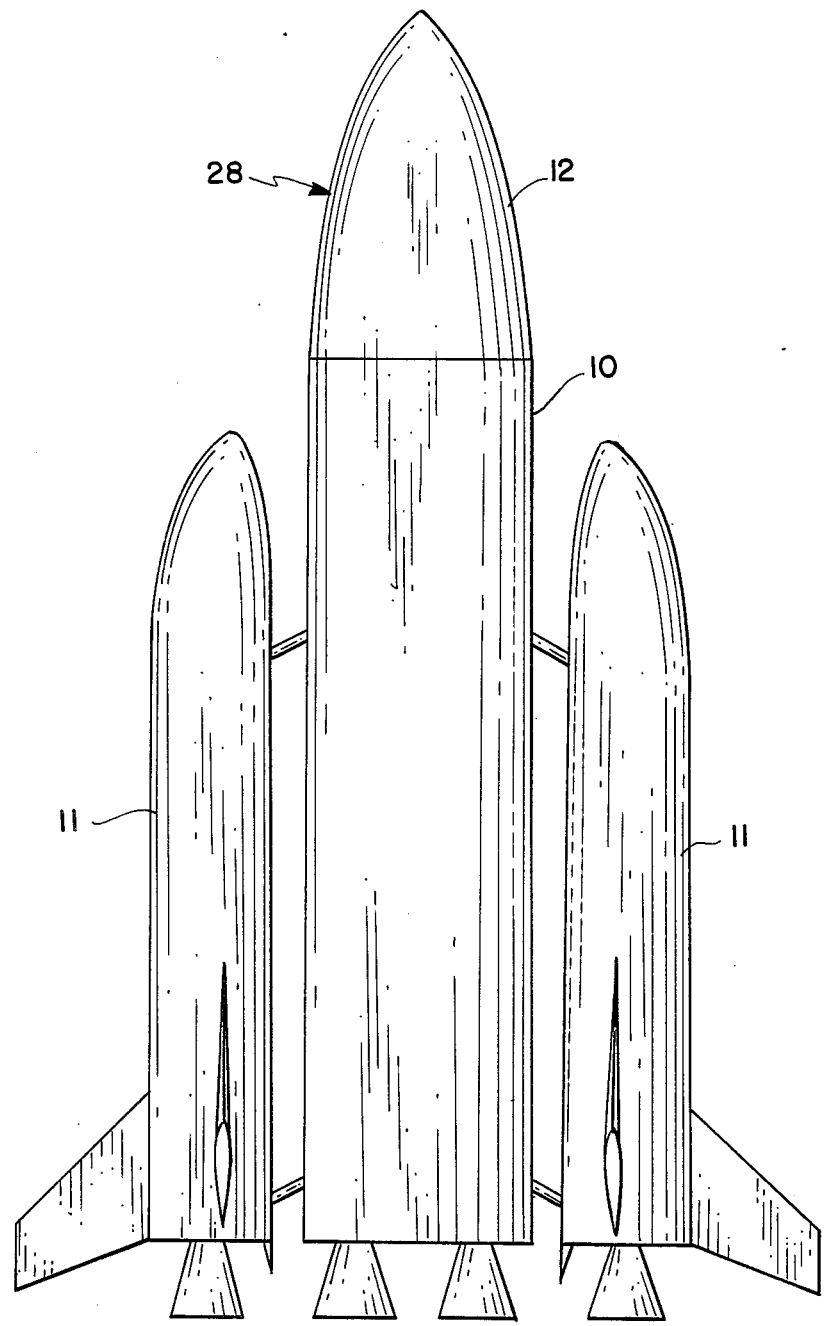
FIG. 1 is a side view illustrating a preferred embodiment of the invention as generally comprising two boosters, an orbital stage, and a payload.

Referring now to FIG. 1, there is shown a general arrangement of the reusable earth-to-orbit vehicle designated generally by the reference number 28. In accordance with the principles of the invention, it comprises an orbital stage 10 to which two booster rockets 11 are detachably secured. A payload 12 may be detachably secured to the top of the orbital stage 10.

Figure 2:
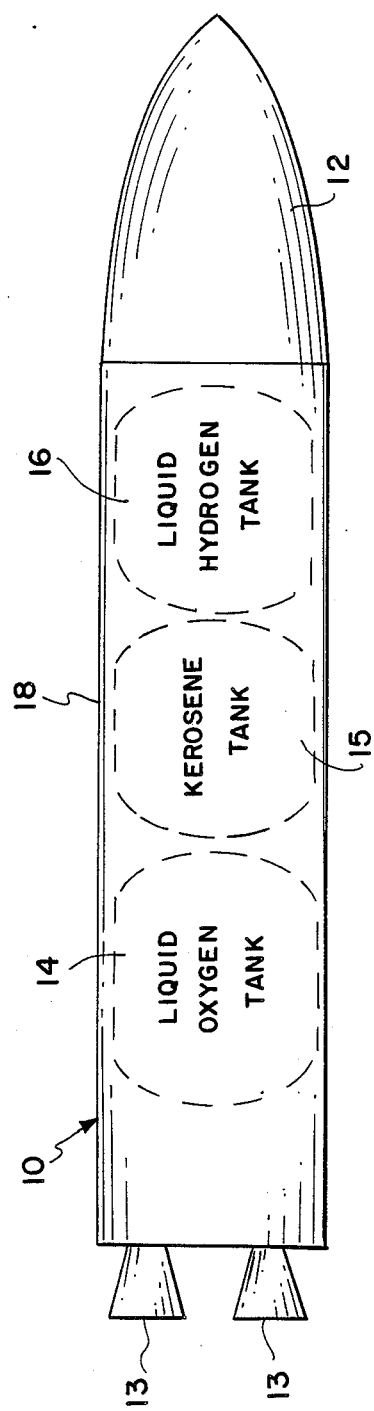
FIG. 2 is a more detailed sketch of the orbital stage shown in FIG. 1.

Referring now to FIG. 2, the interior of the orbital stage includes two hydrocarbon rocket engines 13, a liquid oxygen tank 14, a kerosene tank 15, and a liquid hydrogen tank 16. The exterior surface 18 of the orbital stage 10 is cylindrically shaped and of the known aluminum skin-stringer construction. The orbital stage 10 is sized to fit inside the payload bay 29 of a conventional earth-return-capable space vehicle 26 such as the United States Space Shuttle, as described in detail in the Space Transportation System User Handbook, published in May, 1982 by NASA and incorporated herein by reference. The two hydrocarbon rocket engines 13 use liquid oxygen as an oxidizer, kerosene as a fuel, and liquid hydrogen for cooling and power generation. The top of the exterior structure 18 provides a means for attaching, detaching, and protecting a payload 12.

Figure 4:
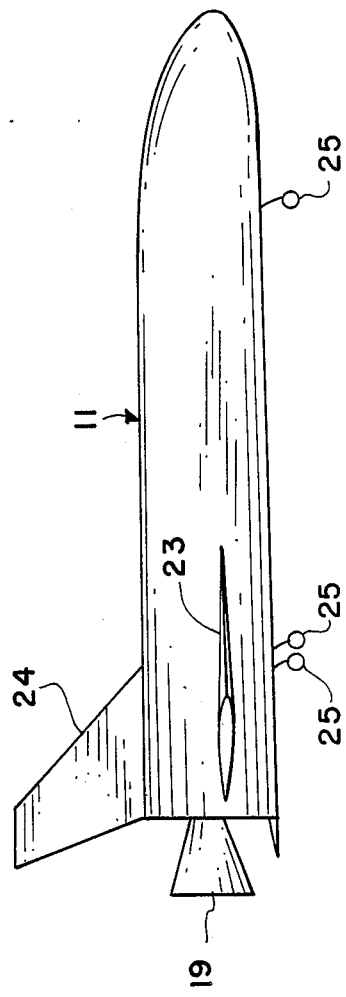
FIG. 4 is a side view of a detached booster shown in FIG. 3.
Figure 3:
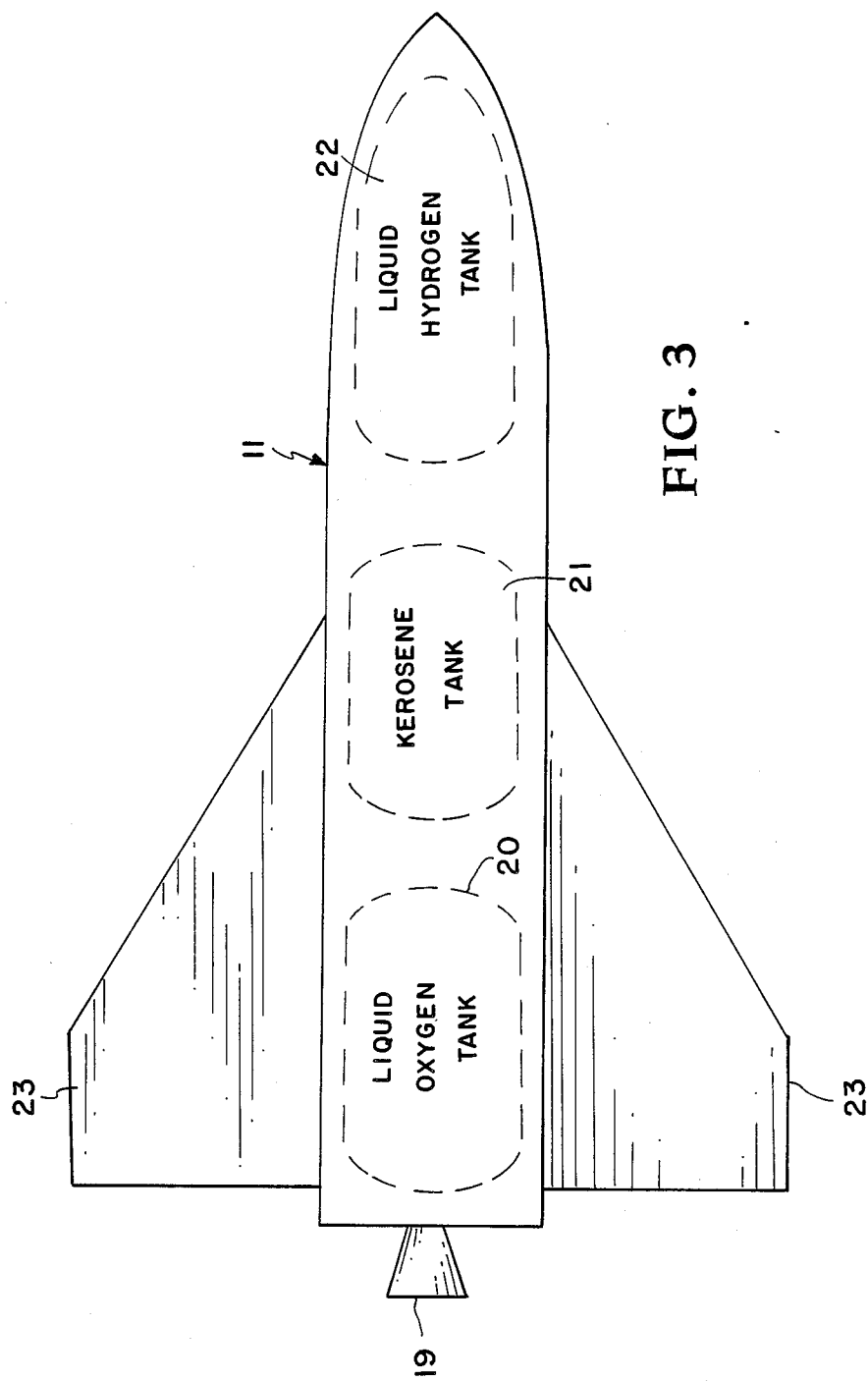
FIG. 3 is a more detailed top view of one of the boosters shown in FIG. 1.

Referring now to FIG. 3, each booster rocket 11 includes one hydrocarbon rocket engine 19, a liquid oxygen tank 20, a kerosene tank 21, a liquid hydrogen tank 22, and two wings 23. As further shown in FIG. 4, each booster rocket 11 is detachable and includes a vertical tail 24, and a deployable landing gear 25. The hydrocarbon rocket engine 19 uses liquid oxygen as an oxidizer, kerosene as a fuel, and liquid hydrogen for cooling and power generation. The wings 23 and vertical tail 24 allow the booster rocket 11 to glide through the earth's atmosphere after separation from the orbital stage 10. The landing gear 25 allows landing on a runway.

Figure 5:
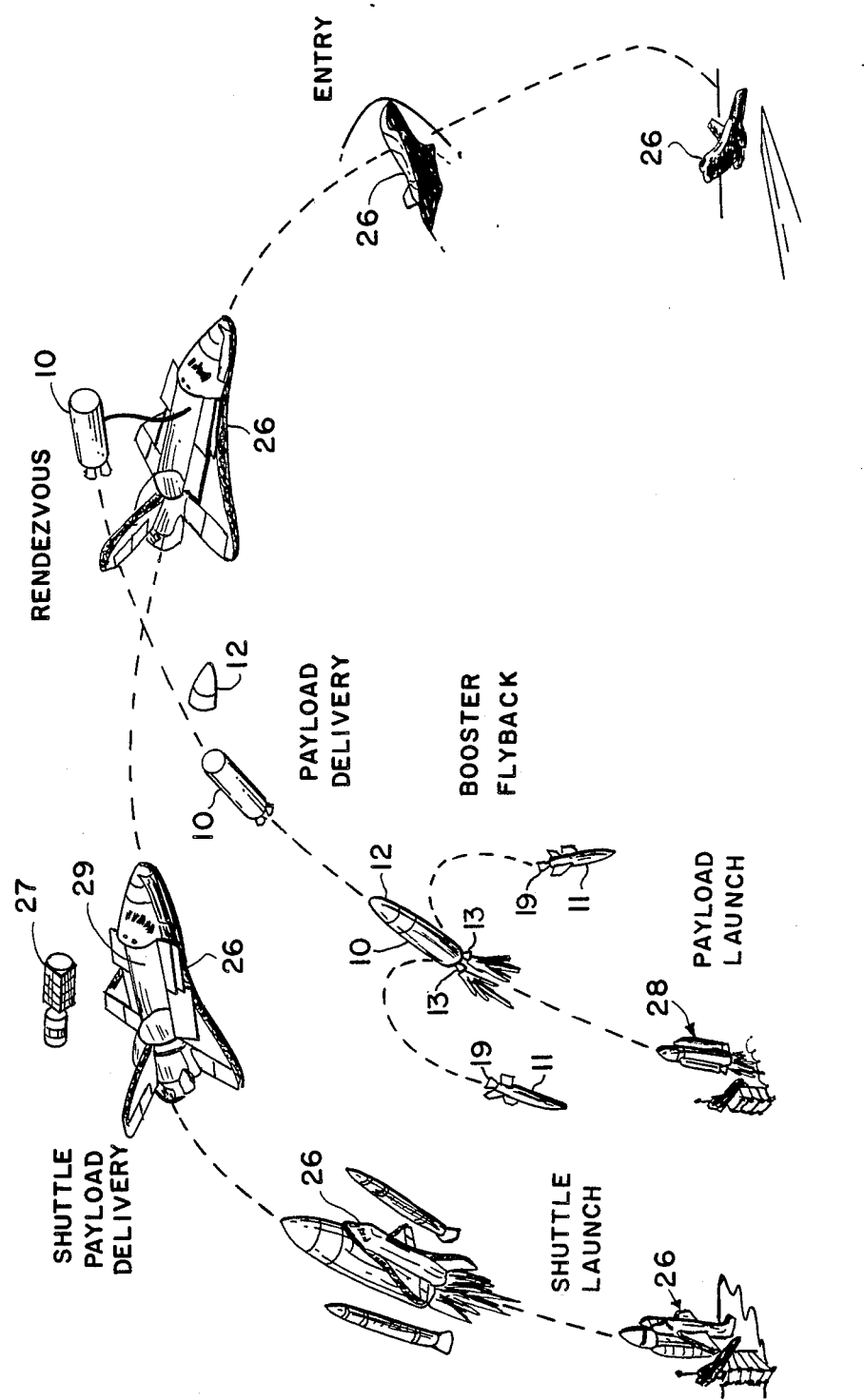
FIG. 5 is an illustration of practicing the method of the invention.

FIG. 5 illustrates a preferred embodiment and a method utilizing the same. An earth-return-capable space vehicle 26 such as the United States Space Shuttle, may as known be launched into earth orbit for the purpose of delivering a payload 27. A reusable earth-to-orbit vehicle 28 in accord with the principles of this invention and as previously described is vertically launched with simultaneous engine ignition of the booster rockets 11 and orbital stage 10.

When a suitable speed such as Mach 3 is reached, engines 19 are shut down and the boosters 11 separate from the orbital stage 10, and glide back to the launch site for an unpowered landing on a runway. Engines 13 continue to operate until the orbital stage 10 goes into an earth orbit. The orbital plane of the orbital stage 10 preferably should be the same as that of the earth-return-capable space vehicle 26.

Thereafter orbital stage 10 releases a payload 12 before completing a rendezvous with the earth-return-capable space vehicle 26. The orbital stage 10 is received in the payload bay 29 of the earth-return-capable space vehicle 26 in which it is returned to earth for reuse.

Although a preferred embodiment of the invention has been described, it should be recognized that this is only an exemplary design. Numerous other modifications, substitutions, and changes may be made to the reusable earth-to-orbit vehicle 28 without departing from the spirit hereof.

What is claimed as new and desired to be secured by Letters Patent of the United States is:

1. A reusable earth-to-orbit vehicle for use in conjunction with a payload bay equipped, earth-return-capable space vehicle comprising:
   an orbital stage sized to fit in the payload bay of said earth-return-capable space vehicle; and
   engine means including rocket means internal of said orbital stage for propelling the said orbital stage from the earth's surface to an earth orbit whereby the said orbital stage including said internal rocket means may be received in the payload bay of said earth-return-capable space vehicle and returned to earth for reuse therein.

2. The reusable earth-to-orbit vehicle of claim 1 wherein said engine means includes:
   at least one internal reusable rocket engine attached within said orbital stage for providing thrust from the earth's surface to earth orbit; and
   at least one external booster means detachably secured to said orbital stage for additional thrust.

3. The reusable earth-to-orbit vehicle of claim 1 wherein said orbital stage includes:
   a cylindrical shaped aluminum alloy skin-stringer body with an internal cavity;
   a hydrocarbon rocket engine attached within said internal cavity;
   a kerosene tank attached within said internal cavity for supplying said hydrocarbon engine with fuel;
   an oxygen tank attached within said internal cavity for supplying said hydrocarbon engine with oxidizer; and
   a hydrogen tank attached within said internal cavity for providing said hydrocarbon engine with hydrogen for cooling and power generation.

4. The engine means of claim 2 wherein said external and detachable booster means includes:
   an aluminum alloy skin-stringer body with an internal cavity;
   a hydrocarbon rocket engine attached within said internal cavity;
   a kerosene tank attached within said internal cavity for supplying said hydrocarbon engine with fuel;
   an oxygen tank attached within said internal cavity for supplying said hydrocarbon engine with oxidizer;
   a hydrogen tank attached within said internal cavity for providing said hydrocarbon engine with hydrogen for cooling and power generation;
   aerodynamic surfaces such as a wing and vertical tail for a controlled return to earth; and
   a deployable landing gear for landing on a runway.

* * * * *